Oct. 6, 1964 G. L. BOCK 3,151,879
TRAILER HITCH WITH LOAD EQUALIZING MECHANISM
Filed July 19, 1961 4 Sheets-Sheet 1
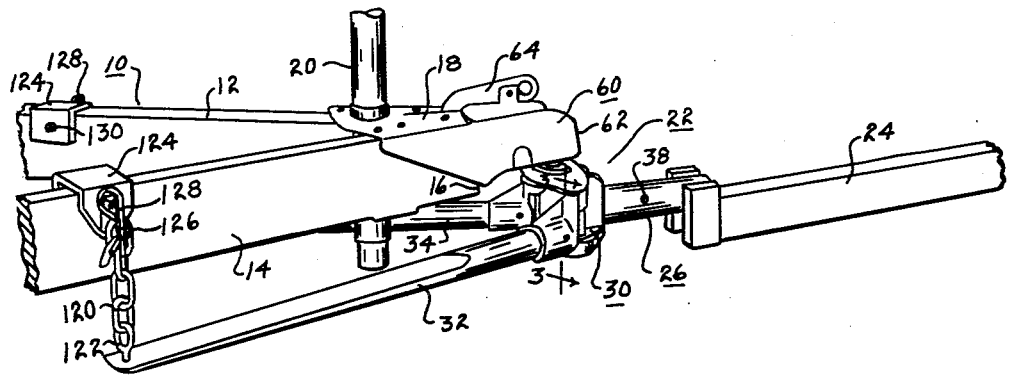
FIG. 1
FIG. 2
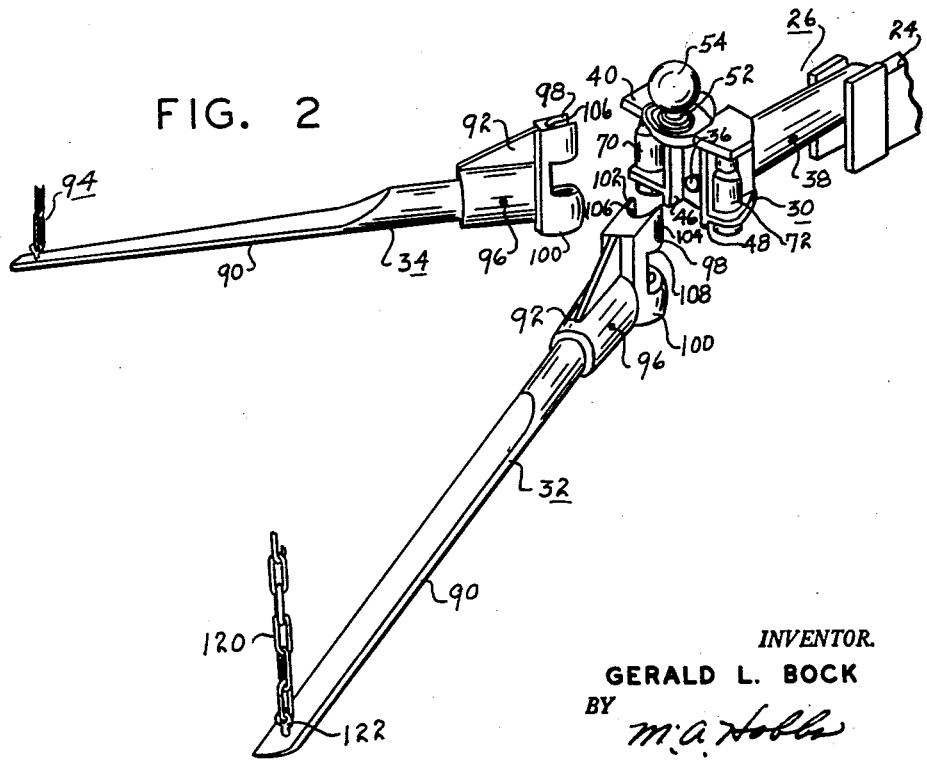
INVENTOR.
GERALD L. BOCK
BY
ATTORNEY Oct. 6, 1964  G. L. BOCK  3,151,879
TRAILER HITCH WITH LOAD EQUALIZING MECHANISM
Filed July 19, 1961  4 Sheets-Sheet 2

INVENTOR.
GERALD L. BOCK
BY  M. A. Hobbs
ATTORNEY

Oct. 6, 1964 G. L. BOCK 3,151,879
TRAILER HITCH WITH LOAD EQUALIZING MECHANISM
Filed July 19, 1961 4 Sheets-Sheet 3

INVENTOR.
GERALD L. BOCK
BY
ATTORNEY

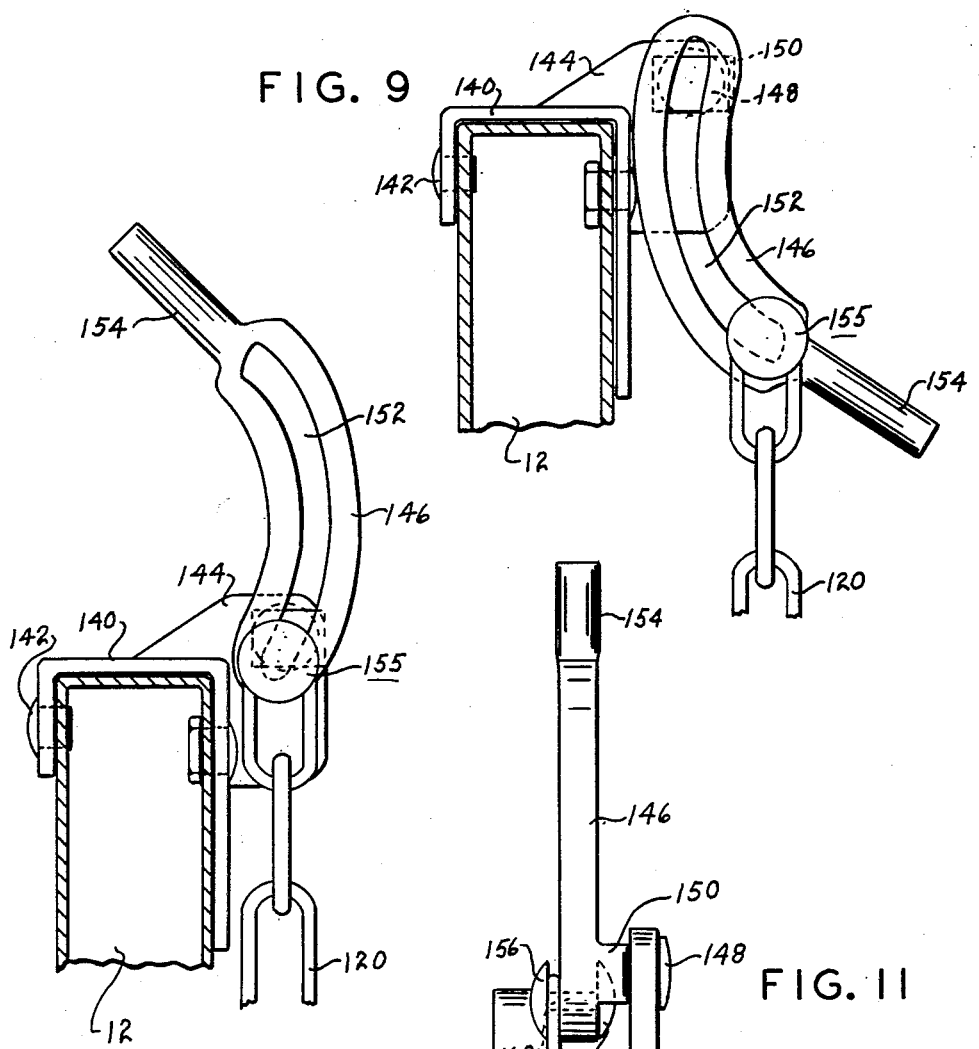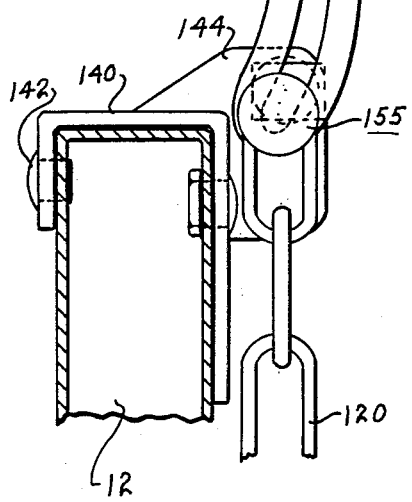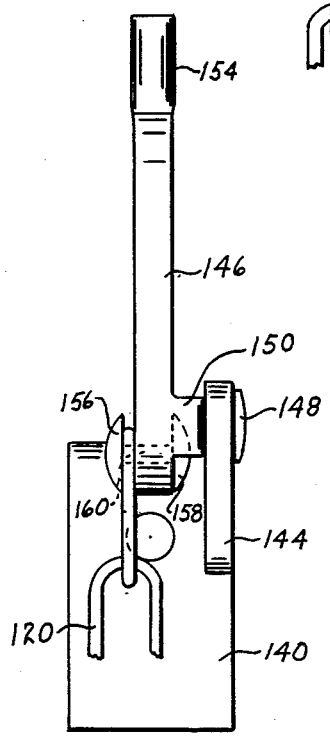

United States Patent Office 3,151,879
Patented Oct. 6, 1964

3,151,879
TRAILER HITCH WITH LOAD EQUALIZING
MECHANISM
Gerald L. Bock, Elkhart, Ind., assignor to Elkhart Welding and Boiler Works, Inc., Elkhart, Ind., a corporation of Indiana
Filed July 19, 1961, Ser. No. 125,201
6 Claims. (Cl. 280—406)

The present invention relates to trailer hitches, and more particularly to trailer hitches having a load equalizing mechanism forming a part thereof.

Within the last few years, mobile homes, house trailers and similar vehicles have been increased in length to the extent that the conventional single pair of wheels or a tandem wheel undercarriage located to the rear of the center of the vehicle places an excessive amount of weight on the rear end of the towing vehicle. With conventional trailer hitches connected to the front end of the trailer and to a draw bar on the towing vehicle, the front end of the trailer and the rear part of the towing vehicle sag, placing an undue load on the rear wheels of the towing vehicle and causing the trailer to assume a forwardly tilted position. Various types of devices have been used in the past to overcome this difficulty, a number of which include a single or dual bar attached to the trailer hitch and extending rearwardly from the towing vehicle beneath or along the side of the forward end of the trailer frame. These bars are resilient and are usually connected to the trailer frame by a yieldable coupling means, which together permit some flexing to occur between the trailer and towing vehicle at the hitch. These prior load equalizing mechanisms have had certain inherent disadvantages which have rendered them unsatisfactory, inconvenient to use and/or even dangerous under certain road conditions or driving maneuvers, including difficulty in installing and removing them from the hitch and trailer, complicated structures rendering them difficult to fabricate, assemble and properly adjust, and accidental unhitching or displacement from the vehicles while the trailer is being towed. It is therefore one of the principal objects of the present invention to provide a load equalizing hitch for connecting a trailer to a towing vehicle, in which the hitch can be fully assembled in operating position between the two vehicles and readily removed therefrom with a few relatively simple operations and which, once installed in proper operating position on the vehicles, remains permanently attached thereto until intentionally removed when the two vehicles are disconnected.

Another object of the invention is to provide a trailer hitch having a load equalizing mechanism therein, which gives maximum road clearance and does not form an obstruction interfering with the viewing of the license plate, and which can be rigidly connected to an automobile by a draw bar of simple and conventional design.

Still another object of the invention is to provide a relatively simple, strong and compact trailer hitch having a load equalizing mechanism therein, which can be readily fabricated and assembled and which can be easily installed on an automobile and trailer at any angle and without the use of special tools or equipment, and by one operator without any special skill or training.

A further object is to provide a load equalizing mechanism of the aforesaid type, having a pair of readily detachable spring bars pivotally connected at one end to the trailer hitch by a socket construction forming a part of the bars and connected at the other end to the trailer frame by a yieldable adjustable means, so that when the bars are removed from the vehicles, the hitch can be used as a simple conventional hitch without any interference from the fixtures used in mounting the bars on the vehicles and without any protuberances or the like detracting from the appearance of the hitch.

Additional objects and advantages of the present invention will become apparent from the following description and accompanying drawings, wherein:

FIGURE 1 is a perspective view of the present load equalizing trailer hitch showing it mounted on a draw bar and connected to the forward frame members of a trailer;

FIGURE 2 is a perspective view of the load equalizing hitch shown in FIGURE 1, with certain parts thereof disassembled;

FIGURE 9 is an elevational view of a modified form of a frame bracket used in conjunction with the present load equalizing hitch, showing the bracket in its inoperative position;

FIGURE 10 is an elevational view of the frame bracket shown in FIGURE 9, showing the bracket in its operative position; and FIGURE 11 is a side elevational view of the bracket shown in FIGURES 9 and 10.

Figure 3:
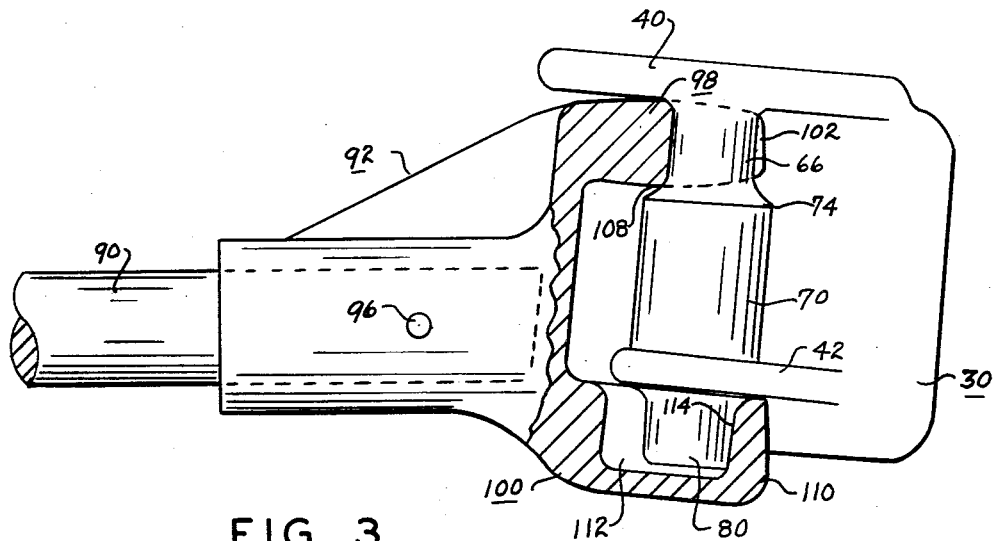
FIGURE 3 is an enlarged partial vertical cross sectional view of the present load equalizing hitch, taken on line 3—3 of FIGURE 1.
Figure 4:
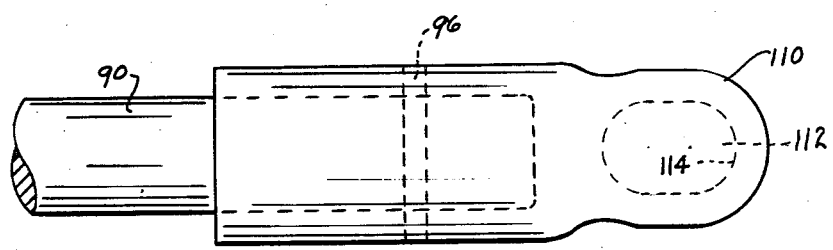
FIGURE 4 is an enlarged bottom view of the fixture used in conjunction with the present load equalizing hitch.
Figure 5:
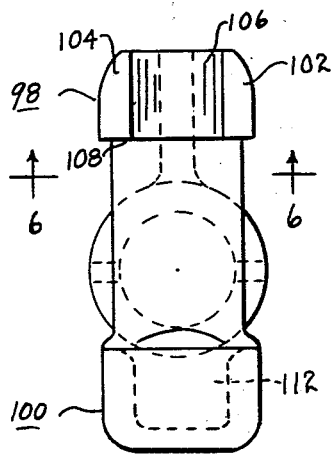
FIGURE 5 is an end view of the fixture shown in FIGURE 4.
Figure 6:
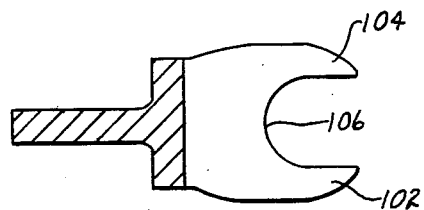
FIGURE 6 is a horizontal cross sectional view of the fixture shown in FIGURES 4 and 5, taken on line 6—6 of the latter figure.
Figure 7:
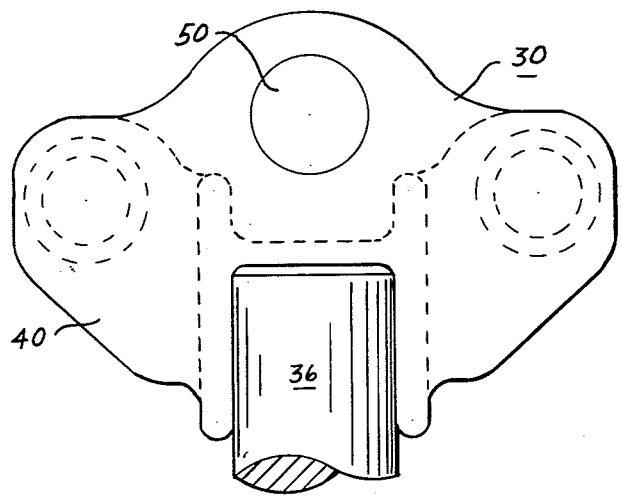
FIGURE 7 is a top plan view of the hitch bracket to which the fixture shown in FIGURES 4, 5 and 6 is attached.
Figure 8:
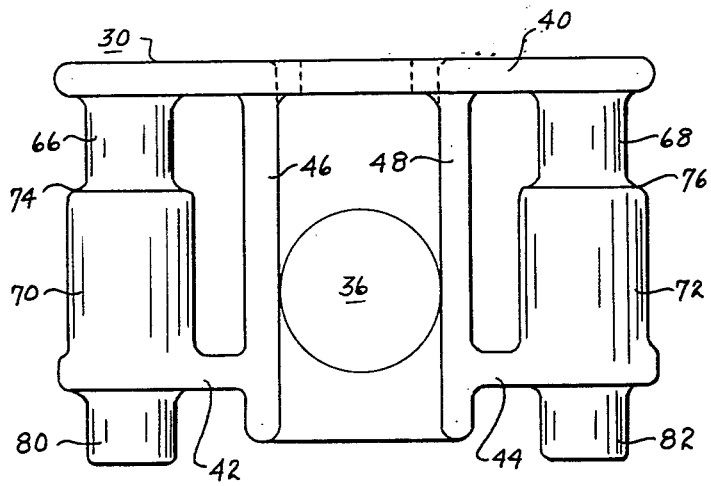
FIGURE 8 is an elevational view of the bracket shown in FIGURE 7 with the fixtures removed therefrom.

Referring more specifically to the drawings and to FIGURE 1 in particular, numeral 10 designates generally a trailer having angularly positioned frame members 12 and 14, preferably joined together at their forward end 16 by welding. The forward end of the frame members supports a plate 18 for a retractable parking wheel structure partially shown at numeral 20. The present load equalizing hitch is shown generally at numeral 22 and is connected to a towing vehicle, such as a conventional automobile, by a draw bar 24, the bar preferably being rigidly bolted at one end to the rear axle of the automobile and supported on the bumper at the other end by any suitable securing means. The rearward end of draw bar 24 includes a releasable attachment means 26 for the hitch. Various types of draw or tow bars may be used in conjunction with the present load equalizing hitch; however, the draw or tow bar for larger sized trailers should be firmly secured to the automobile, preferably to the rear axle thereof. A number of suitable draw bars with which the present hitch can be used are available on the market. The trailers on which the present hitch can be mounted may be of various sizes and constructions, and the members of the forward end of the frame may be parallel or they may be angular as shown in FIGURE 1. However, on the majority of the large trailers to which the present hitch is particularly applicable, the frame members are usually in the position shown. For the purpose of the present invention, the draw bar and trailer frame members are considered conventional and of well known construction, and will not be described in detail herein.

The present load equalizing hitch consists principally of ball mount bracket 30, spring bar assembly 32 and spring bar assembly 34. The bracket is constructed of metal and is provided with a cylindrical projection 36, extending forwardly from the bracket and received in attachment means 26, the projection 36 being held in attachment means 26 by a transversely positioned pin 38 extending through both the attachment means and the projection. This pin is readily removable form its position in the attachment means to permit the projection to be withdrawn therefrom when bracket 30 is being removed from the towing vehicle. The projection is preferably welded rigidly to bracket 30; however, this projection may be varied in construction from one bracket to another in order to adapt the present hitch to various types of tow or draw bar devices.

The bracket 30 consists of an upper horizontal support plate 40 and lower horizontal support members 42 and 44, the two members being joined rigidly to vertical support members 46 and 48, respectively, the latter two members in turn being joined rigidly to the underside of upper plate 40. This entire hitch bracket is preferably constructed of cast steel with the parts thereof being joined integrally to one another. Upper plate 40 contains a hole 50 for receiving a stem 52 of ball 54, the ball being held rigidly in place by a suitable securing means such as a pin or nut on the lower end of stem 52 beneath plate 40. The hitch bracket 30 together with projection 36 and ball 54 form the principal part of the towing vehicle part of the present hitch and can be used in this form in conjunction with conventional type socket means on the trailer, such as that shown at numeral 60, consisting of a cap 62 forming a socket for receiving ball 54 and having a latching mechanism 64 for retaining the ball in the socket while the trailer is being towed by the automobile.

The hitch bracket is provided with upper bearing members 66 and 68 joined rigidly at their upper ends to the underside of plate 40 and to the upper surface of members 42 and 44, respectively, by connecting members 70 and 72. Bearing members 66 and 68 are cylindrical in shape and are somewhat smaller in diameter than members 70 and 72 in order to provide the supporting shoulders 74 and 76, respectively. The hitch is provided with lower bearing members 80 and 82 projecting downwardly from the underside of support members 42 and 44, respectively, and being cylindrical in shape and joined rigidly to the respective support members. The cylindrical bearing members 66 and 80 and bearing members 68 and 82 are in axial alignment and of substantially the same diameter and are adapted to support one end of the spring bar assemblies 32 and 34.

The two spring bars 32 and 34 are identical in construction, each consisting of an elongated resilient steel bar 90, fixture 92 rigidly joined to one end of spring bar 90 and frame bracket assembly 94. Bar 90 may be of various shapes, in addition to that shown in the drawings, such as rectangular or round, and may be of various lengths and sizes depending upon the intended installation. Fixture 92 is rigidly secured to the end of bar 90 by rivet or pin 96 or by any other suitable securing means and consists of a yoke portion 98 and a socket portion 100, the yoke having two forwardly projecting arms 102 and 104 defining a U-shaped recess 106 for receiving one of the upper bearing members 66 or 68. The curvature of U-shaped recess 106 is substantially the same as the bearing members, and the recess is smaller than members 70 and 72 so that the lower edge 108 of yoke 98 will seat on and be supported by shoulder 74 or 76. Socket portion 100 consists of an outer wall 110 spaced downwardly from yoke 98 and defining an elongated recess 112, the elongation of the recess being parallel with the spring bar and the wall at the forward end of the recess forming a bearing surface for engaging the forward side of lower bearing members 80 or 82.

The spring bar assembly is mounted on the hitch bracket in the manner illustrated in FIGURE 3 with the inner surface of U-shaped recess 106 engaging the rear side of upper bearing member 66 or 68, and the forward side 114 of the wall defining recess 112 engaging the forward side of lower bearing member 80 or 82. In assembling the spring bar, socket portion 100 is first slipped upwardly onto lower bearing member 80 or 82 while the spring bar is tilted downwardly sufficiently to maintain the yoke and the upper bearing member in spaced relation. After the socket portion has been moved upwardly against support member 42 or 44, the spring bar is then tilted upwardly to place the yoke 98 around upper bearing member 66 or 68 with the rear surface of the latter bearing member against the inner surface of U-shaped recess 106. In order to remove the spring bar assembly from the hitch bracket, the reverse operation is performed.

After the spring bar assembly has been mounted on the hitch bracket in the foregoing manner, the rear or free end thereof is attached by a yieldable frame bracket assembly 94, the one shown in FIGURES 1 and 2 consisting of a chain 120 attached to the end of the spring bar by a bolt and eye 122 and a U-shaped bracket 124 placed over the upper edge of the respective frame member and having an outwardly projecting pin 126 for receiving the proper link of chain 120. The chain is held in place on pin 126 by a cotter key 128 or the like. Preferably, bracket 124 is held in place by a set screw 130 or a pin extending through the two arms of bracket 124 and through the frame member.

It is seen that the present load equalizing hitch provides a resilient support connection between the draw bar of the towing vehicle and the frame of the trailer, so that undue sagging between the trailer and the towing vehicle at the hitch is completely eliminated or minimized. The amount of tension on the spring bars can be varied by selecting different lengths in chain 120 for pin 126. When the proper adjustment has been made, the frame members 12 and 14 and draw bar 24 remain in substantially parallel and horizontal relationship.

One of the particular advantages of the present invention is the fact that the hitch bracket can be used with or without the spring bar assemblies, and, when it is being used without the bar, the bracket has the appearance of a conventional trailer hitch. The spring bars can be mounted readily and with little difficulty whenever their use is required and can be readily removed whenever the trailer is to be unhitched from the automobile. Along with the foregoing advantages is the further advantage that the spring bar assemblies remain fully engaged with the hitch bracket regardless of the angular position between the trailer and towing vehicle. Other types of load equalizing hitches in this general field are either difficult to assemble and install or are unreliable while the vehicles are operating in adverse conditions or maneuvering in close situations.

A modified form of frame bracket assembly is illustrated in FIGURES 9, 10 and 11, consisting of a fixture 140 adapted to embrace the upper portion of frame member 12 or 14 and being held thereto by a set screw, or the like, 142, extending through the fixture and engaging the frame member. Joined to fixture 140 is a laterally extending support 144 joined to an arcuate lever 146 by a rivet or bolt 148, extending through extension 144 and through a lug 150, joined integrally to lever 146. Lever 146 contains an arcuate slot 152 and an operating handle 154 on the free end thereof, and is adapted to pivot from the position shown in FIGURE 9 to the position shown in FIGURE 10. Slidably mounted in slot 152 is a spool-like member 155 having heads 156 and 158 connected by a shaft 160. This member slides from one end to the other in slot 152, and supports the upper end of chain 120 for placing tension on the spring bars. It is apparent from FIGURES 9 and 10 that the spring bar can readily be placed under tension by moving the bracket arm lever 146 from the position shown in FIGURE 9 to the position shown in FIGURE 10. As the lever is moved upwardly from the position shown in FIGURE 9, member 155 slides in slot 152, raising the upper end of the chain from its lower position shown in FIGURE 9 to its upper position adjacent the upper edge of frame 12. When lever 146 is in its upper position, member 154 is below the pivot point of rivet 148, and consequently, is held by the downward force of the spring bar in the lower end of slot 152, thereby holding lever 146 in its raised position without any additional locking means being required.

While only one embodiment of the present invention and one modification thereof have been described in detail herein, various other modifications and changes may be made without departing from the scope of the invention.

I claim:

1. A load equalizing hitch for connecting a trailer having forwardly extending frame members to an automobile, comprising a bracket for attaching said hitch to the automobile, upper and lower laterally extending horizontally positioned plate-like members on said bracket, two upper cylindrical bearing members mounted between said plate-like members and secured thereto and spaced laterally from one another, two lower cylindrical bearing members projecting downwardly from said lower plate-like member and in axial alignment with the respective upper bearing members, a ball member mounted on the upper portion of said bracket, a member mounted on the trailer for engaging said ball member, a spring bar assembly for each laterally disposed upper and lower bearing member, each assembly including an elongated resilient steel bar, a fixture on one end of said bar having a substantially U-shaped yoke with the opening thereof facing generally forward for receiving one of said upper bearing members and a socket with an elongated recess, the elongation of the recess extending generally parallel with the bar for receiving the respective lower bearing members, and a yieldable fixture including an adjustable chain linkage on the other end of said bar for connecting said bar to the trailer frame members.

2. A load equalizing hitch for connecting a trailer having forwardly extending frame members to a towing vehicle, comprising a bracket for mounting on a towing vehicle, upper and lower laterally extending horizontally positioned plate-like members on said bracket, two upper cylindrical bearing members mounted between said plate-like members and secured thereto and spaced laterally from one another, two lower cylindrical bearing members projecting downwardly from said lower plate-like member and in axial alignment with the respective upper bearing members, a ball member mounted on the upper position of said bracket, a member mounted on the trailer for engaging said ball member, a spring bar assembly for each laterally disposed upper and lower bearing member, each assembly including an elongated resilient steel bar, a fixture on one end of said bar having a yoke with the opening thereof facing generally forward for receiving one of said upper bearing members and a socket with an elongated recess, the elongation of the recess extending generally parallel with the bar for receiving the respective lower bearing members, and a yieldable fixture on the other end of said bar for connecting said bar to the trailer frame members.

3. A load equalizing hitch for connecting a trailer to a towing vehicle, comprising a bracket for mounting on a towing vehicle, upper and lower laterally extending horizontally positioned plate-like members on said bracket, two upper cylindrical bearing members mounted between said plate-like members and secured thereto and spaced laterally from one another, two lower cylindrical bearing members projecting downwardly from said lower plate-like member and in axial alignment with the respective upper bearing members, a spring bar assembly for each laterally disposed upper and lower bearing member, each assembly including an elongated resilient steel bar, a fixture on one end of said bar having a yoke with the opening thereof facing generally forward for receiving one of said upper bearing members and a socket with an elongated recess, the elongation of the recess extending generally parallel with the bar for receiving the corresponding lower bearing members, and a fixture including an adjustable chain linkage on the other end of said bar for connecting said bar to the trailer.

4. A load equalizing hitch for connecting a trailer to a towing vehicle, comprising a bracket for mounting on a towing vehicle, upper and lower laterally extending horizontally positioned plate-like members on said bracket, two upper bearing members mounted between said plate-like members and secured thereto and spaced laterally from one another, two lower bearing members projecting downwardly from said lower plate-like member and in axial alignment with the respective upper bearing members, a spring bar assembly for each laterally disposed upper and lower bearing member, each assembly including a bar, a fixture on one end of said bar having a yoke with the opening thereof facing generally forward for receiving one of said upper bearing members and a socket for receiving the corresponding lower bearing members, and a fixture on the other end of said bar for connecting said bar to the trailer.

5. In a load equalizing hitch for connecting a trailer to a towing vehicle: a bracket for mounting on a towing vehicle, upper and lower laterally extending horizontally positioned plate-like members on said bracket, two upper cylindrical bearing members mounted between said plate-like members and secured thereto, two lower cylindrical bearing members projecting downwardly from said lower plate-like member in axial alignment with the respective upper bearing members, a ball member mounted on the upper portion of said bracket, a member mounted on the trailer for engaging said ball member, a spring bar assembly including an elongated resilient steel bar, a fixture on one end of said bar having a substantially U-shaped yoke with the opening thereof facing generally forward for receiving one of said upper bearing members and a socket with an elongated recess, the elongation of the recess extending generally parallel with the bar for receiving the corresponding lower bearing members, and a yieldable fixture including an adjustable chain linkage on the other end of said bar for connecting said bar to the trailer.

6. In a load equalizing hitch for connecting a trailer to a towing vehicle: a bracket for mounting on a towing vehicle, upper and lower laterally extending horizontally positioned plate-like members on said bracket, two upper bearing members mounted between said plate-like members and secured thereto, two lower bearing members projecting downwardly from said lower plate-like member in axial alignment with the respective upper bearing members, a spring bar assembly including a bar, a fixture on one end of said bar having a yoke with the opening thereof facing generally forward for receiving one of said upper bearing members and a socket for receiving the corresponding lower bearing members, and a fixture on the other end of said bar for connecting said bar to the trailer.

References Cited in the file of this patent

UNITED STATES PATENTS

| | | |
|---|---|---|
| 974,049 | Gaddis | Oct. 25, 1910 |
| 1,542,629 | Massuere | June 16, 1925 |
| 2,715,034 | Cornwall | Aug. 9, 1955 |
| 2,729,467 | Reese | Jan. 3, 1956 |
| 2,762,605 | Holmboe | Sept. 11, 1956 |
| 2,906,544 | Watts | Sept. 29, 1959 |
| 2,918,308 | Lowman | Dec. 22, 1959 |
| 2,952,475 | Reese | Sept. 13, 1960 |